Figure 1:
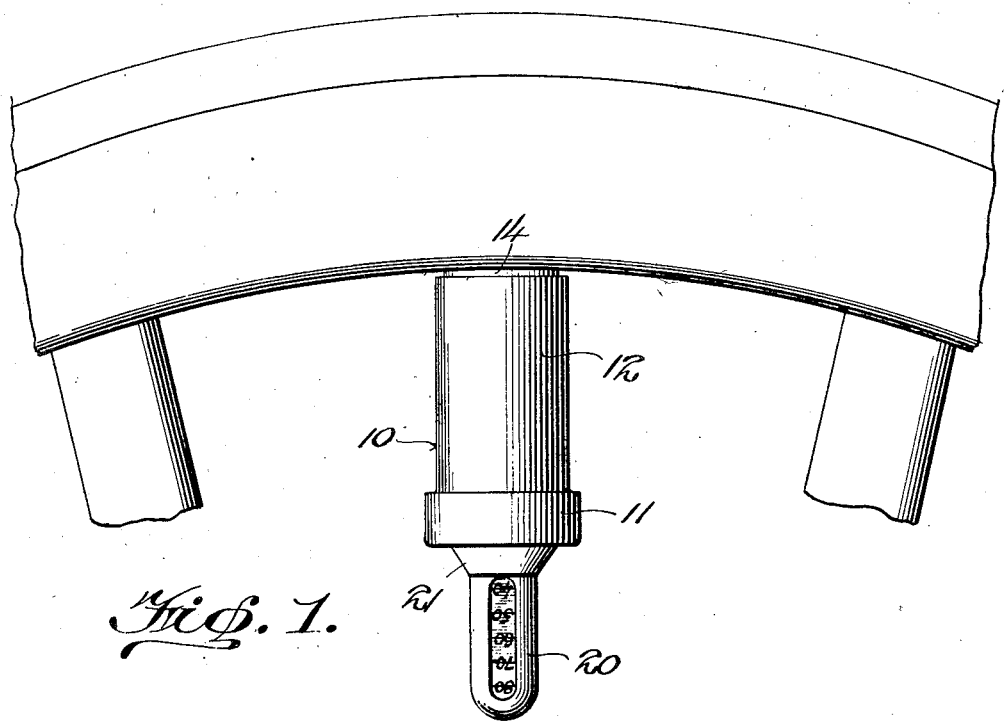

April 8, 1924.

C. C. SHEPPARD

TIRE PRESSURE GAUGE

Filed April 9, 1921

1,490,036

Inventor
C. C. Sheppard,
by Bright & Bailey
Attorney

Patented Apr. 8, 1924.

1,490,036

UNITED STATES PATENT OFFICE.

CREEDY C. SHEPPARD, OF WASHINGTON, DISTRICT OF COLUMBIA.

TIRE-PRESSURE GAUGE.

Application filed April 9, 1921. Serial No. 459,851.

*To all whom it may concern:*

Be it known that I, CREEDY C. SHEPPARD, a citizen of the United States, and resident of Washington, in the District of Columbia, have invented certain new and useful Improvements in Tire-Pressure Gauges, of which the following is a specification.

My invention relates to pressure gauges and it is my broad purpose to provide a gauge of improved construction for indicating at all times the pressure of air in pneumatic tires.

My improved gauge consists of separate elements secured in assembly to provide a unitary device adapted to be applied to the casing of a tire valve and including means to open the valve to permit the air in the tire to act on a flexible diaphragm and through the flexible diaphragm on a column of liquid contained in a transparent calibrated member whereby the pressure of the air in the tire is indicated, and it is another purpose of my invention to provide a gauge of this character which may be attached to ordinary types of tire valves without altering the same; which is compact, possessing few parts and cheap to produce; and which will indicate the pressure of the air in a tire in any position in which the wheel carrying the same may stop.

My inventive idea is capable of embodiment in different mechanical structures, one of which is illustrated in the accompanying drawings, but it is to be understood that the structure shown is merely intended to disclose the essential characteristics of my invention in a preferred form and that its scope is as defined in the appended claims.

In the drawings, wherein like characters of reference denote corresponding parts in the separate views:—

Figure 2:
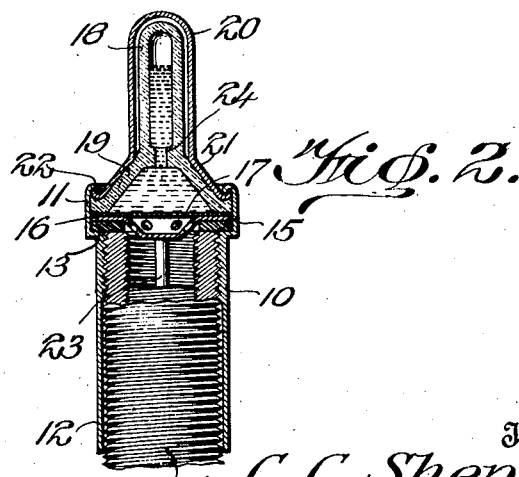

Fig. 1 is a fragmentary side elevation of a portion of a wheel showing the application of my improved gauge thereto; and Fig. 2 is a longitudinal section through the gauge.

Referring to the drawings in detail 10 designates a tubular member, one end portion 11 of which is of relatively greater diameter than the remaining major portion 12, thereby forming between said portions a shoulder 13, and said major portion is internally screw threaded throughout any desirable portion of its length whereby the member may be applied to the exteriorly threaded casing of an ordinary tire valve such as is shown at 14.

Adapted for permanent association with the member 10 is a gasket 15; a centrally dished disk 16, the dished portion of which is apertured; a flexible diaphragm 17, preferably though not necessarily formed of rubber; a transparent liquid containing member 18 in the form of a tube having one end flared outwardly as at 19; and a casing 20 having the shape of the transparent member which it is adapted to enclose.

In assembling the parts just mentioned the gasket 15 is arranged within the portion 11 in abutting relation to the shoulder 13 and the dished disk 16 is arranged with its marginal portion resting against the gasket, after which the flexible diaphragm 17 is positioned against said marginal portion of the dished disk and the flared end 19 of the transparent member 18 seated against said diaphragm, the casing 20 being finally placed over the member 18 with its flared portion 21 resting against the outer surface of flared portion 19. With the parts so arranged the adjacent ends of the casing 20 and the portion 11 of the tubular member 10 are crimped together as shown at 22 whereby all of said parts are secured in permanent assembly.

It will be observed that the gasket 15 is of a width allowing a portion of the same to extend inwardly beyond the inner threaded surface of the portion 12 of the tubular member, and that the dished portion of the disk 15 is disposed so as to engage and depress the valve stem 23 to open the valve when the gauge is applied thereto while at the same time permitting the diaphragm 17 to flex freely under the influence of the pressure of the air in the tire reaching the same through the apertures in said dished portion, escape of air to the atmosphere or past the marginal portion of the dished disk being prevented by the compression of the inwardly extending portion of the gasket between the outer end of the tire valve casing and said marginal portion of the disk when the gauge is threaded on the valve casing as is apparent.

A proper amount of suitable indicating substance is placed in the transparent member 18 before the parts are permanently assembled and the tube is calibrated to indicate by movement of the substance within the tube predetermined pressures against the diaphragm, the casing 20 having one or more sight openings therein whereby the indication of the liquid may be readily observed.

Adjacent its inner end the transparent member 18 is contracted as shown at 24 which allows the adhesive force of capillary attraction to prevent movement of the liquid within the member except when actuated by pressures on said diaphragm. This prevents an interchange of liquid and air within the member when the wheel carrying the gauge is stopped with the gauge inverted.

If a rubber diaphragm is used it is unnecessary to place a gasket between it and the inner end of the transparent member or between it and the dished disk, but if a diaphragm of some other substance is used at least one other gasket will likely be found necessary to prevent the leakage of air. Likewise my combination of parts may be varied from the arbitrary arrangement shown within the scope of my invention as set forth in the following claims.

I claim:—

1. A tire pressure gauge comprising a transparent liquid containing member, a flexible disk providing a diaphragm arranged in abutting and closing relation with the inner open end of said member, a perforated member directly abutting said disk and adapted for engagement with a tire valve to open the same when the guage is applied thereto, whereby the air discharged from the tire directly contacts with the diaphragm after passing through the perforations of said means to cause said diaphragm to act upon the liquid contained in said member and thereby indicate the air pressure, and means acting to hold the elements aforementioned in cooperative relation.

2. A tire pressure gauge comprising a transparent liquid containing member, a flexible disk providing a diaphragm arranged in closing relation to the inner open end of said member, a rigid perforated dished disk arranged in abutting relation with said diaphragm and adapted to engage with and open a tire valve when the guage is applied thereto to cause the air in the tire to act on said diaphragm and consequently upon the liquid contained in said member to thereby indicate the pressure thereof, a gasket arranged in abutting relation with said dished disk for engagement with the tire valve to prevent the escape of air to the atmosphere, and a tubular housing enclosing said member, diaphragm, dished disk and gasket and acting to hold all of the same together in close and permanent assembly.

3. A tire pressure gauge comprising in combination, a transparent liquid containing member having an inner open end, a diaphragm arranged in closing relation with the inner open end of said member, said diaphragm consisting of a flexible disk, a device adjacent to said diaphragm for engagement with a tire valve to open the same, and means effecting a clamping force through said device against said diaphragm to retain the later in closing relation with respect to the open end of said transparent member.

4. A tire pressure gauge including a tubular body portion, a transparent liquid containing member, a casing engageable with and enclosing said transparent member, a flexible diaphragm retaining the liquid within said transparent member, an apertured dished disk arranged within said body portion in abutting relation to a portion of said diaphragm, said body portion being shouldered, and a gasket arranged between the shoulder of said body portion and said disk, the adjacent ends of said body portion and said casing being crimped together to thereby hold all parts of the gauge in permanent assembly, said gasket being disposed so as to engage the casing of a tire valve and provide an air tight seal preventing the escape of air from the tire when the gauge is applied to said valve, and said dished disk being disposed so as to engage with the stem and open the valve when the gauge is applied thereto whereby the air in the tire is allowed to act on said diaphragm and consequently said liquid to thereby indicate the pressure thereof.

5. A pressure gauge adapted to be applied to the casing of a tire valve to at all times indicate the pressure of air in the tire, including a hollow transparent member containing a liquid indicating substance, a flexible diaphragm cooperating with the liquid contained in said member and means to open the tire valve when the gauge is applied thereto to permit the air in the tube to act through said diaphragm on said substance to thereby indicate the pressure of the air in the tire, said transparent member being of relatively large internal diameter and having a restricted portion to cause the adhesive force of capillary attraction to prevent movement of said substance except by the pressure of air in the tire.

In testimony whereof I hereunto affix my signature.

CREEDY C. SHEPPARD.